United States Patent [19]

Couch, Jr. et al.

[11] Patent Number: 5,414,236
[45] Date of Patent: May 9, 1995

[54] PROCESS FOR HIGH QUALITY PLASMA ARC CUTTING OF STAINLESS STEEL AND ALUMINUM

[75] Inventors: Richard W. Couch, Jr., Hanover, N.H.; Nicholas A. Sanders, Norwich, Vt.; Zhipeng Lu; Lifeng Luo, both of Lebanon, N.H.

[73] Assignee: Hypertherm, Inc., Hanover, N.H.

[21] Appl. No.: 989,183

[22] Filed: Dec. 11, 1992

[51] Int. Cl.$^6$ .............................................. B23K 10/00
[52] U.S. Cl. .......................... 219/121.39; 219/121.44; 219/121.51; 219/121.59; 219/121.55
[58] Field of Search ...................... 219/121.45, 121.46, 219/121.51, 121.53, 121.54, 75, 121.59, 121.39, 121.44

[56] References Cited

U.S. PATENT DOCUMENTS

| | | | |
|---|---|---|---|
| 3,567,898 | 3/1971 | Fein | 219/121 |
| 3,575,568 | 4/1971 | Tateno | 219/121.36 |
| 3,619,549 | 11/1971 | Hogan | 219/121 |
| 4,174,477 | 11/1979 | Essers et al. | 219/121.46 |
| 4,410,788 | 10/1983 | Summers et al. | 219/130.1 |
| 4,885,455 | 12/1989 | Schultz et al. | 219/121.46 |
| 4,918,283 | 4/1990 | Yamade et al. | 219/121.46 |
| 4,977,305 | 12/1990 | Severance, Jr. | 219/121.39 |

FOREIGN PATENT DOCUMENTS 3118981 5/1991 Japan .................................. 219/121.46

OTHER PUBLICATIONS

Poncon, V. et al., Industrial Laser Review, "The Importance of Gases in Laser Material Processing", Oct. 1992.

Whitehouse, D., The Fabricator, "Lasers in Fabricating: Achieving Maximum Productivity", Conference May 19–21, 1992, Chicago, Illinois.

*Primary Examiner*—Mark H. Paschall
*Attorney, Agent, or Firm*—Testa, Hurwitz & Thibeault

[57] ABSTRACT

A plasma arc torch uses a mix of reactive and reducing gas flows to cut sheets of stainless steel, aluminum and other non-ferrous metals. The reducing gas flow to the cut is varied as a percentage of the total gas flow to maintain a reducing atmosphere down through the cut, but to leave a predominantly oxidizing atmosphere at the intersection of the cut and the bottom surface of the sheet being out. These flows can also be characterized as either a plasma gas flow, one that forms the arc, or a shield gas flow that surrounds the arc. The reactive gas is preferably a flow of air, oxygen, nitrogen, carbon dioxide or a combination of these gases. The reactive gas is usually in the plasma gas flow, whether alone or mixed with other gases. The reducing gas is preferably hydrogen, hydrogen 35, methane, or a mixture of these gases. For aluminum, the reactive gas is preferably air or nitrogen and the reducing gas is preferably methane or a mixture of methane and air.

14 Claims, 2 Drawing Sheets

PROCESS FOR HIGH QUALITY PLASMA ARC CUTTING OF STAINLESS STEEL AND ALUMINUM

BACKGROUND OF THE INVENTION

This invention relates in general to plasma arc cutting of sheet metals. More specifically, it relates to a mixture of type and proportion of gases forming and/or shielding the arc that yield very clean, shiny, and dross-free cuts in stainless steel, aluminum and other non-ferrous metals.

Plasma arc cutting of sheet metals is now used widely. However, heretofore for stainless steel and non-ferrous metals such as aluminum it has not been possible to produce a clean cut, one where there is a shiny kerf that is free of oxides or nitrides of the metal being cut, which is also free of bottom dross.

The plasma arc is a jet of an ionized gas. While many gases can be used to form the arc, the gas selected is usually specific to the metal being cut. For example, to cut stainless steel, it is most common to use air, nitrogen, or a mixture of argon and hydrogen.

Nitrogen and air leave no bottom dross, but the cut quality is poor. The sides of the kerf have oxide or nitride inclusions and they undergo a change in metallurgical structure. In order to weld at this cut, or to obtain an acceptable appearance, it is necessary to grind or wire-brush the cut sides.

It is known that argon-hydrogen may be used as the plasma gas to cut stainless steel. While these cuts are metallurgically "sheen", that is, shiny and clean, but at least for cuts in thin sheets, argon-hydrogen leaves a bottom dross that is unusually difficult to remove. Sheeny, dross-free cuts are possible with argon-hydrogen for sheets with a thickness in excess of about 0.5 inch (12.7 mm) using a 200 ampere torch and in excess of about 0.25 inch (6.4 mm) using a 100 ampere torch. No plasma cutting technique has been found that produces sheeny kerfs without dross when cutting aluminum, regardless of its thickness.

It is also well known to use shield gases, typically a secondary gas flow through the torch that is independent of the plasma gas flow and surrounds the arc, whether by impinging on it as it exits the torch or downstream, near or at the workpiece. Shield gases can serve a variety of functions, such as cooling, isolation of the cutting action in the kerf from the atmosphere, and the protection of the torch against upwardly splatterd molten metal. Plasma and shield gases are used, for example, in the plasma arc cutting torches sold by Hypertherm, Inc. of Hanover, N.H. under its trade designations MAX®200, MAX®100, MAX®100D and HD1070. The numbers 200, 100 and 70 denote current ratings for these torches. None of the known torches using shield gases have demonstrated any ability to improve on the cut quality of known nitrogen, air and argon-hydrogen cutting when used on stainless steel and non-ferrous metals such as aluminum.

It is therefore a principal object of the present invention to provide a plasma arc cutting process that can cut stainless steel, aluminum and other non-ferrous metals with an extremely high cut quality.

A further principal object is to provide a cutting process that is adaptable to different metals and different torches, including high density torches, and torches using only a plasma gas or ones using plasma and shield gases.

Another object is to provide a cutting process with the foregoing advantages even when used on thin sheets of the metal.

Still another object is to provide all of the foregoing advantages using known equipment and operating materials and at a favorable cost.

SUMMARY OF THE INVENTION

At least one gas flow of a plasma flow and shield flow to a plasma arc cutting torch constitutes or contains as a component of a mixed flow of gases a reducing gas. The gas flows also include a gas that reacts with the metal. The flow ratio of the reducing gas flow to the total gas flow to the cut, whether introduced as the plasma gas, the shield gas, or a component of one or both of those gases, is controlled so that the reducing gas is completely dissipated in the kerf. As a result, the reducing gas has a negligibly small concentration at region defined by the kerf and the bottom surface of metal workpiece. Stated conversely, the atmosphere at the bottom surface is predominantly oxidizing. The gas selection and control of the reducing gas ratio can be defined functionally as ones which provide a reducing atmosphere that extends through the kerf, from the top to the bottom surfaces of the workpiece, but which also produce an oxidizing atmosphere at the bottom surface. The ratio which yields this result varies empirically with the type of metal, the power of the torch, the type of gases being used, and the thickness of the workpiece. For a given application, the ratio varies with the thickness. This process produces high quality cuts in stainless steel, aluminum, and other non-ferrous metals. The cuts are sheeny and free of bottom dross.

While this mixture of gases can be formed solely in a plasma gas, the gases are preferably introduced as plasma and shield gases. The reactive and reducing gases can appear, solely or in mixture, as either one of, or both of, these gas flows.

To cut stainless steel with a high definition torch at low power, the plasma gas is preferably air or nitrogen flowing typically at 40 scfh (standard cubic feet per hour) for low to medium power applications. With nitrogen as the plasma gas, the shield gas can be methane or methane and air. The ratio of the methane flow rate to air flow rate ranges from about 5% to 25% depending on the thickness of the workpiece. A typical shield gas flow rate is in the range of 20 to 60 scfh, depending on the thickness. For high definition cutting of aluminum, the plasma gas is again air or nitrogen with methane as a shield gas. With a nitrogen plasma gas, the methane can be mixed with air, again in varying ratios to accommodate different thicknesses.

Plasma gases for a standard plasma arc torch can include hydrogen, hydrogen 35 mixed with nitrogen, and a mixture of hydrogen and nitrogen, and air. Shield gases include nitrogen and carbon dioxide. Nitrogen is the preferred shield gas with either the hydrogen 35 and nitrogen mixture or the hydrogen-nitrogen mixture as the plasma gas.

For stainless steel and aluminum, the reactive gas is preferably nitrogen, air, other mixtures of oxygen and nitrogen other than air. Reducing gases can include hydrogen, hydrogen 35, methane, and other flammable hydrocarbon gases known to combine with oxygen. The reducing gas preferably constitutes between 2% and 50% of the total gas flow—plasma gas and shield gas, if any—depending on the thickness of the workpiece, other parameters being constant.

These and other features and objects of the present invention will be more clearly understood from the following detailed description which should be read in light of the accompanying drawings.

DETAILED DESCRIPTION OF THE PREFERRED EMBODIMENTS

Figure 1:
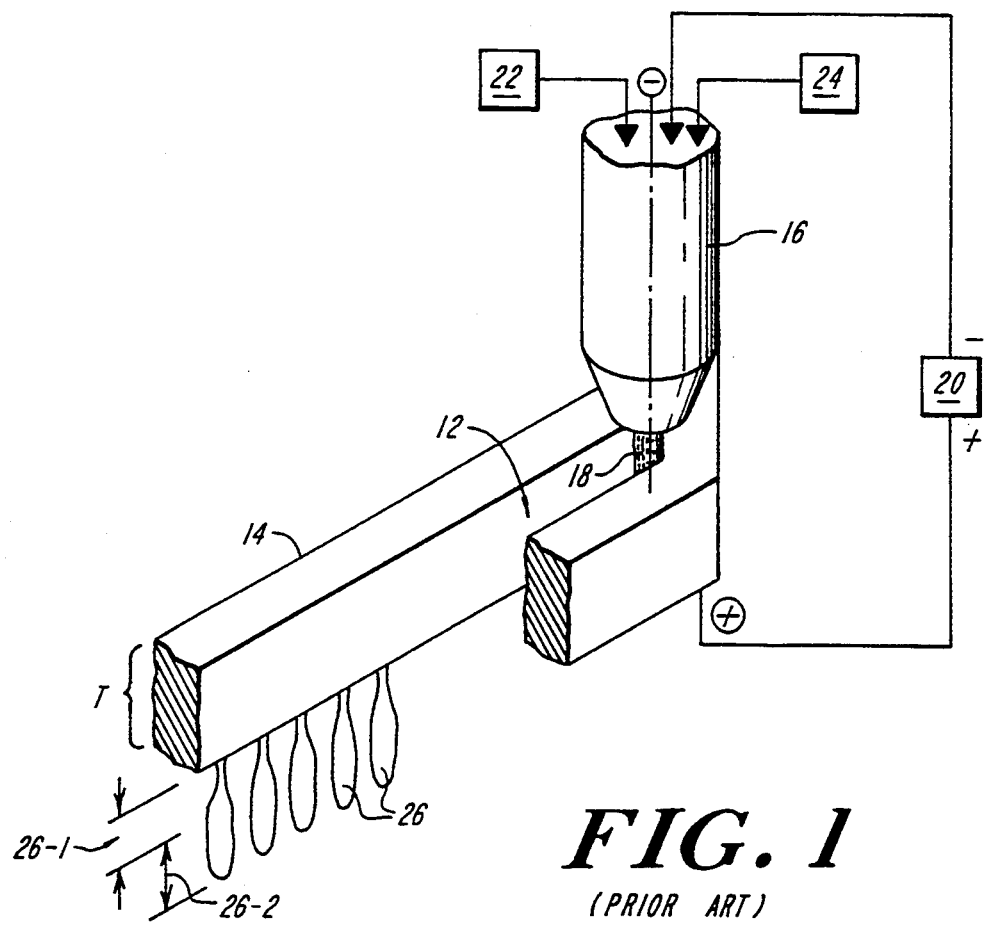
FIG. 1 is a view in perspective of a prior art plasma arc, argon-hydrogen cutting of a sheet of stainless steel.

FIG. 1 shows prior art plasma arc cutting of a kerf 12 in a workpiece 14, in this case a stainless steel plate. A plasma arc cutting torch 16 of known construction produces an arc 18 that transfers from the torch to the workpiece to produce the kerf. The arc 18 is a jet of ionized gas that conducts current to the workpiece. A DC power supply 20 is connected in series with the torch and the workpiece. The plasma gas is an argon-hydrogen mixture, typically 35% hydrogen and 65% argon by volume, commercially sold as hydrogen 35. A regulated, adjustable rate supply 22 of the plasma gas is illustrated schematically. Depending on the torch and application, the cutting torch can also receive a flow of a shield gas from a separate regulated, adjustable flow rate supply 24. Typical torches 16 include the standard cutting torches sold by Hypertherm, Inc. of Hanover, N.H. under its trade designations MAX®100, MAX®100D, and MAX®200 and its high density 70 ampere torch sold under the trade designations "HyDefinition" and "HD1070".

This particular prior art system can cut stainless steel sheets while producing a clean, shiny kerf. However, as noted above, it also produces a very difficult bottom dross 26. The dross forms in two regions. An upper region 26-1 near the kerf retains a metallic look. In a lower region 26-2, the dross is dark from the formation of oxides.

Figure 2:
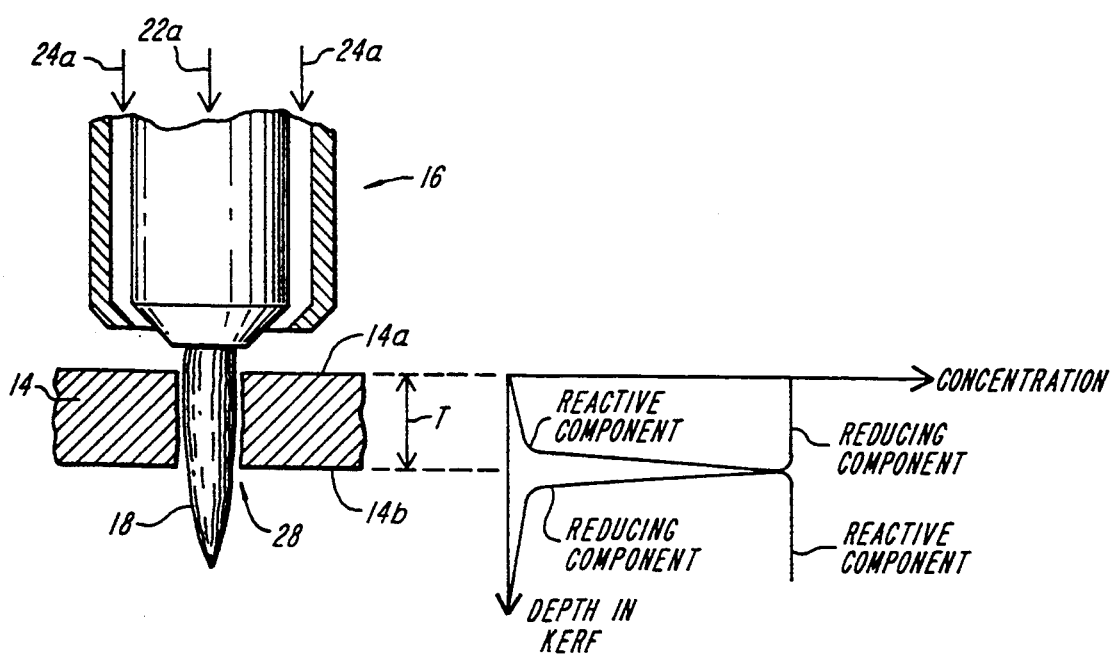
FIG. 2 is a simplified view in vertical section of a gas shield plasma arc cutting torch operating according to the process of the present invention together with an associated graph showing the concentrations of oxygen and hydrogen in the kerf as a function of the depth of the kerf.

FIG. 2 shows a plasma cutting system according to the present invention. As in FIG. 1, the plasma arc torch is a known type such as the MAX® and HyDefinition TM products identified above using a plasma gas flow 22a and a shield gas flow 24a. The power of the torch, as measured by its operating current, typically range from low power units of 15 to 50 amperes, to high power units of 400 to 500 amperes. For high definition torches, relatively small currents, e.g. 70 amperes are typical, but at a very high current density. Typical standard torch currents for the most common thicknesses are 100 to 200 amperes.

The workpiece 14 is a sheet. It can assume other forms, such as a firearm barrel, a bolt, or contoured structural member, but the cutting of sheets, including plates, is the most common application. An "upper" surface 14a of the sheet will then be understood to be the surface of the workpiece opposite the plasma torch. A bottom surface 14b faces away from the torch. For a sheet workpiece, the surfaces 14a and 14b are generally flat and parallel. The plate thickness T measured along a normal to the surfaces 14a,14b can vary from thin sheets, e.g. $\frac{1}{8}$ inch (3.1 mm) to plates 2 inches (51 mm) thick.

A principal feature of the present invention is that the gas flow or flows from the torch to the kerf include as a constituent gas at least one gas of a type that reacts with the metal of the workpiece, and as another constituent gas a different type of gas that produces a reduction reaction, particularly one that will react chemically in a reduction reaction with reactive gases such as oxygen, or nitrogen, or a mixture of the two such as air. The reactive gas and the reducing gas can be mixed to form the plasma gas, or the shield gas, or they can be separated, one in the plasma gas flow and the other in the shield gas flow.

Figure 3:
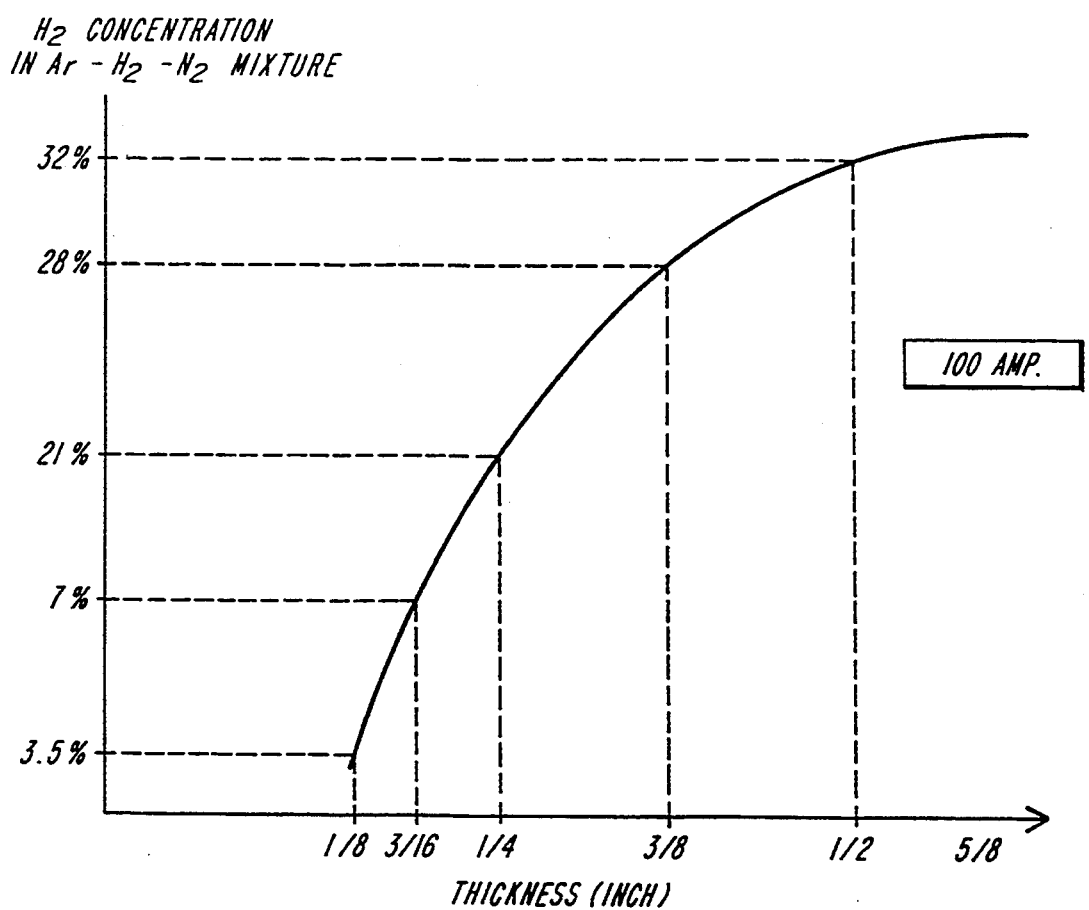
FIG. 3 is a graph of the percentage of reducing gas in a particular plasma gas flow according to the present invention as a function of the thickness of the workpiece.

A further principal feature of the present invention is that the amount of the reducing gas is carefully controlled as a portion of the total gas flow to the kerf—the sum of the plasma and shield gases where both are used. (Some ambient air or other gas flows may also enter the kerf, but they are usually present in insignificant amounts or are sufficiently removed from the cutting action as to be of little or no functional consequence.) The degree of control is conveniently expressed as the ratio of the flow rate of the reducing gas or gases to the total gas flow rate. This ratio varies with parameters such as the type of metal being cut, its thickness, the type and power of the torch, and the type or types of gas forming the plasma and shield gas flows. For a given application, the control ratio varies mainly as a function of the plate thickness. FIG. 3 shows a typical such relationship for the cutting of stainless steel plate with a MAX®100D brand torch with a mixture of argon, hydrogen and nitrogen. The curve in FIG. 3 shows that for this example the ratio of hydrogen to the total gas flow should be about 3.5% for thin plates ($\frac{1}{8}$ inch), but about 32% for thick plates ($\frac{1}{2}$ inch). While the precise values will vary for each application, the general form of the curve shown in FIG. 3 defines this relationship. In general, the ratio of the reducing gas to total gas flow that will provide the results of the present invention falls in the range of about 2% to about 50%. The precise value for each application can be determined empirically by examining the cut quality for different ratios at a selected thickness, or at different thicknesses for a selected ratio.

This ratio control produces a predominantly reducing atmosphere within the kerf at the arc. This reflects a predominant concentration of the reducing gas extending from the upper surface 14a, substantially through the kerf, to a region 28 at the intersection of the kerf and the bottom surface 14b. At the region 28 there is then predominantly oxidizing atmosphere. This is reflected in FIG. 2 in the high concentration of reactive gas (e.g. oxygen) at the surface 14b and the negligible concentration of reducing gas (e.g. hydrogen). When properly controlled, it is believed that the amount of the hydrogen or other reducing gas present in the flow is used up in chemical reaction with the reactive gas in the kerf. This condition produces cuts in stainless steel and non-ferrous metals of a quality that heretofore never been obtained using plasma arc cutting, regardless of the thickness of the workpiece.

While the precise mechanism(s) that produce this result are not known with certainty, applicants are of the opinion that the predominantly reducing atmosphere in the kerf prevents an oxidizing reaction between the molten metal being cut and reactive gases present in the kerf. (The oxidizing reaction is the one which cuts the metal, e.g. the creation of oxides or nitrides of the metal being cut which are carried away by the plasma jet.) The reducing gas (or its ions or radicals formed in the plasma) is believed to react with the oxidizing gas (or its ions or radicals formed in the plasma) preferentially. In the region 28, the predominantly oxidizing atmosphere is believed to be essential to oxidize molten metal before it runs out of the bottom of the kerf to form a dross. This analysis provides a functional guide for the control over the reducing gas portion of the total gas flow. If there is too little reducing gas, the kerf will not be sheeny throughout. If there is too much reducing gas, a dross will form.

As an illustration of the process of the present invention, but not as a limitation, applicants give the following examples of this invention which have been successfully practiced using Hypertherm MAX®100D and HyDefinition HD1070 ™ cutting systems on stainless steel and aluminum sheets having thicknesses that varied from ⅛ inch to ⅜ inch.

Using an HD1070 ™ system to cut stainless steel, the following combinations of plasma and shield gases were used successfully at typical flow rates of 40 scfh for the plasma gas and 20 to 60 scfh for the shield gas, with the variation in shield flow rate corresponding to the thickness of the workpiece generally as shown in FIG. 3.

TABLE I

| (High Density, Stainless) | |
|---|---|
| Plasma Gas | Shield Gas |
| $N_2$ | $CH_4$ (methane) |
| air | $CH_4$ |
| $N_2$ | $CH_4$ and air |
| air | $CH_4$ and air |

The ratio of methane to air varies from about 5:95 to 25:75 depending on the thickness of workpiece, the total shield gas flow rate being constant.

Using the HD1070 ™ system to cut aluminum, Table II gives successful plasma and shield gases at the flow rates given above with respect to Table I. The shield gas mix of air and methane is variable from almost 100% methane to almost no methane, depending again on the thickness of the aluminum sheet being cut.

TABLE II

| (Aluminum) | |
|---|---|
| Plasma Gas | Shield Gas |
| air | $CH_4$ |
| $N_2$ | $CH_4$ and air |

Table III gives suitable plasma and shield gases for cutting stainless steel with a MAX®100D system. Typical flow rates are those given above with respect to Table I.

TABLE III

| (Standard Arc, Stainless) | |
|---|---|
| Plasma Gas | Shield Gas |
| Hydrogen 35 and $N_2$ | $N_2$ |
| $H_2$ and $N_2$ | $N_2$ |
| Hydrogen 35 and $N_2$ | $CO_2$ |

TABLE III-continued

| (Standard Arc, Stainless) | |
|---|---|
| Plasma Gas | Shield Gas |
| $H_2$ and $N_2$ | $CO_2$ |

The percentage of hydrogen 35 in the mixture varies from about 10% for thin sheets to about 90% for thick sheets. The percentage of $H_2$ in the second and fourth mixtures varies from about 3.5% for thin sheets to about 35% for thick sheets.

There has been described a process which produces high quality—sheeny and dross free—cuts in stainless steel and non-ferrous metals such as aluminum using plasma arc cutting. The invention can produce these results on sheets or other configurations having any of a wide variety of thicknesses using high density plasma cutting systems and standard plasma cutting systems. The invention is also compatible with plasma cutting systems operating over a wide range of power levels and with mechanical shields and gas flow shields against upwardly splattered molten metal.

While the invention has been described with respect to its preferred embodiments, it will be understood that various modifications and variations will occur to those skilled in the art from the foregoing detailed description and the accompanying drawings. For example, while the examples use mainly nitrogen and air as the reactive gases, other reactive gases including oxygen alone, oxygen-bearing gases, and oxygen-nitrogen mixes not in the proportion of air are contemplated. Similarly, other reducing gases can be used. In particular methane is illustrative of a class of flammable gases that combine with oxygen in an exothermic reaction, although perhaps having a greater cost or producing undesirable byproducts. These and other modifications and variations that occur to those skilled in the art are intended to fall within the scope of the appended claims.

What is claimed is:

1. A plasma arc cutting process for producing a high quality kerf in stainless steel and non-ferrous workpieces that have an upper surface adjacent a plasma arc torch and a bottom surface opposite the torch, where the torch has a total gas flow including at least a plasma gas that forms the arc, the process comprising the steps of:

forming a portion of the total gas flow from a reducing gas, and adjusting the ratio of said reducing gas flow to said total gas flow based on thickness of the workpiece prior to cutting such that said reducing gas flow constitutes a value of between about 2 to 50 percent of said total gas flow, to thereby produce during cutting a predominantly reducing atmosphere through the kerf and a predominantly oxidizing atmosphere generally at the region defined by the bottom surface and the kerf.

2. The cutting process of claim 1 wherein said adjusting step comprises mixing at least one gas that is reactive and at least one reducing gas.

3. The cutting process of claim 2 wherein said mixing is a mixing of said plasma gas and a shield gas that generally surrounds the arc at the workpiece.

4. The cutting process of claim 2 wherein said mixing is a mixing of component gases of at least one of said plasma gas and a shield gas that generally surrounds the arc at the workpiece.

5. The cutting process of claim 1 wherein said adjusting step comprises limiting the ratio of the reducing gas to the total gas flow such that said reducing gas decreases to a negligible value at said region.

6. The cutting process of claim 1 wherein said adjusting step further comprises increasing the ratio of said reducing gas to the total gas flow with an increasing of the thickness of the workpiece.

7. The cutting process of claim 1 wherein said total gas flow further comprises a shield gas that generally surrounds the arc at the workpiece.

8. A process for high quality plasma arc cutting of stainless steel and non-ferrous workpieces with a plasma arc torch that produces an arc in a plasma gas flow that transfers from the torch to the workpiece for cutting a kerf through the workpiece to a bottom surface, wherein the torch has a total gas flow therethrough including at least the plasma gas flow, the process comprising:

forming said total gas flow of at least one reactive gas and at lease one reducing gas, and adjusting the relative proportions of said at least one reducing gas and at least one reactive gas based on thickness of the workpiece prior to cutting so that said reducing gas constitutes a value of between about 2 to 50 percent of said total gas flow, to produce a kerf which is substantially sheeny and has substantially no bottom dross.

9. The cutting process of claim 8 wherein when said workpiece is stainless steel, said reactive gas is selected from the group consisting of oxygen, nitrogen, carbon dioxide and mixtures of these gases, including air, and said reducing gas is selected from the group consisting of hydrogen, hydrogen 35, methane, and mixtures of these gases.

10. The cutting process of claim 8 wherein when said non-ferrous workpiece is aluminum, said reactive gas is selected from the group consisting of nitrogen and air and said reducing gas is methane.

11. A process for producing a high quality cut in sheets of stainless steel and non-ferrous metals with a plasma arc cutting torch that produces an arc in a plasma gas flow from the torch that transfers to an upper surface of the sheet and cuts a kerf that extends to a bottom surface of the sheet, and wherein the torch has a total gas flow including at least the plasma gas flow, the process comprising, forming said plasma gas at least in part from a reactive gas, forming said total gas flow at least in part from a reducing gas, and controlling the ratio of the reducing gas flow to the total gas flow based on thickness of said sheet prior to cutting such that said reducing gas constitutes a value of between about 2 to 50 percent of said total gas flow, wherein the reducing gas is consumed in the kerf during cutting leaving a negligible concentration of said reducing gas at said bottom surface.

12. The process according to claim 11 wherein said controlling step includes increasing said ratio corresponding to an increased thickness of the workpiece.

13. The process according to claim 11 wherein said reactive gas is selected from the group consisting of oxygen, nitrogen, carbon dioxide and mixtures of these gases, including air, and wherein said reducing gas is selected from the group consisting of hydrogen, hydrogen 35, methane, and mixtures of these gases.

14. The process to claim 13 wherein when said metal is aluminum of an aluminum alloy, said reactive gas is selected from the group consisting of air and nitrogen and said reducing gas is selected from the group consisting of methane and a mixture of air and methane.

* * * * *